Nov. 6, 1923.
J. C. ROGERS
1,473,518
WAGON BRAKE
Filed April 20, 1922
2 Sheets-Sheet 2
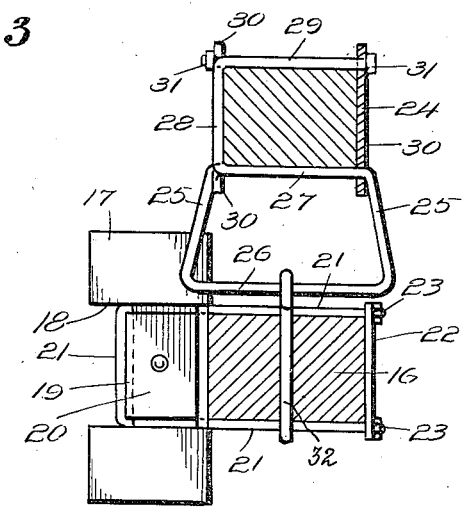
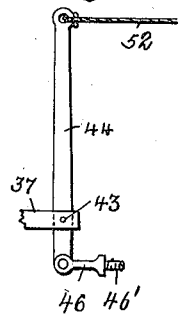
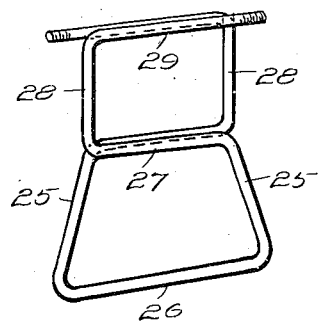
Joseph Claud Rogers,
INVENTOR.
BY Geo. P. Kimmel
ATTORNEY.

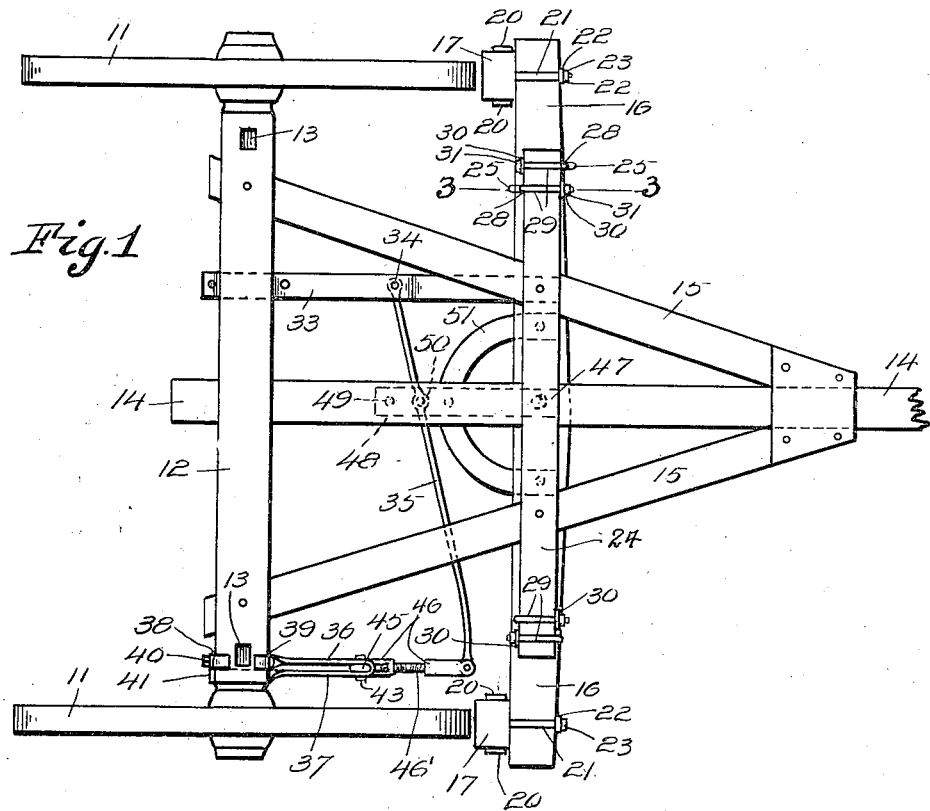
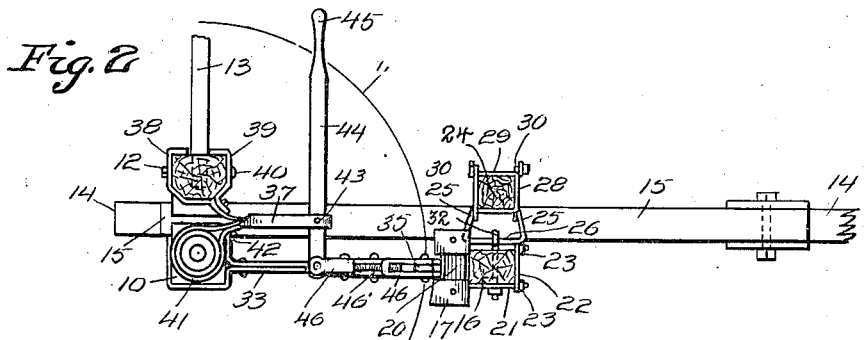

Patented Nov. 6, 1923.

1,473,518

UNITED STATES PATENT OFFICE.

JOSEPH CLAUD ROGERS, OF PROSPECT STATION, TENNESSEE, ASSIGNOR OF ONE-SIXTH TO GEORGIE SHERRILL ABERNARTY AND ONE-SIXTH TO JOHN W. JONES, BOTH OF PROSPECT STATION, TENNESSEE.

WAGON BRAKE.

Application filed April 20, 1922. Serial No. 555,712.

*To all whom it may concern:*

Be it known that I, JOSEPH CLAUD ROGERS, a citizen of the United States, residing at Prospect Station, in the county of Giles and State of Tennessee, have invented certain new and useful Improvements in Wagon Brakes, of which the following is a specification.

This invention relates to vehicle brakes, and has for one of its objects to simplify and improve the construction, increase the efficiency and utility of devices of this character.

Another object of the invention is to provide a device of this character which may be applied without material structural changes to vehicles of various forms and sizes.

With these and other objects in view the invention consists in certain novel features of construction as hereinafter shown and described and then specifically pointed out in the claims, and in the drawings illustrative of the preferred embodiment of the invention:—

Figure 1 is a plan view of the rear portion of the running gear of a conventional wagon with the improved brake apparatus applied thereto.

Fig. 2 is a side elevation of the same.

Figs. 3, 4 and 5 are enlarged details of the coupling devices between the rear hounds and the brake beam.

Figure 6 is a detail illustrating the construction of the force applying lever device.

The improved device is designed more particularly for use upon heavy farm or freight wagons and is shown thus applied, the rear axle being represented at 10, the carrying wheels at 11, and with the rear bolster at 12 mounted thereon in the usual manner.

The rear bolster is shown with the usual supporting stakes at 13. A portion of the reach member is represented at 14 and the rear hounds at 15.

The brake beam is represented at 16 and carries the brake shoes 17 in position to engage the wheels 18. Each of the shoes 17 is formed with a transverse recess 18 in its bearing face and with a wear plate 19 in the bottom of the recess and with supporting flanges 20 at the ends bearing over the side faces of the shoe.

A U bolt 21 is extended through each shoe with its bend engaging the plate 19 and its sides passing over the upper and lower faces of the beam 16. The terminals of the U bolt engage through a clamp plate 22 and are threaded at the ends to receive nuts 23.

By this means the shoes are firmly clamped to the beam 16 and can be readily detached for renewal or repairs.

Attached over the upper faces of the hound members 15 is a support 24, and coupled to the member 24 at each end is a suspension link device to movably couple the beam 16 thereto.

Each link device is formed from a single rod bent initially into U shape with the side portions 25 converging from the horizontal bend 26, and the side portions bent inwardly in parallel relation to the portion 26 and spaced therefrom as shown at 27 in Figs. 3 and 4, to bear beneath the member 24 and thence extended upwardly along the sides of the member 24 as shown at 28 and thence again bent into parallel relation to the portions 26 and 27 and over the upper face of the member 24, as shown at 29.

The terminals of the portions 29 extend through clamp plates 30 and are threaded to receive holding nuts 31. The plates 30 are also apertured to receive the portions 27 of the link members, as indicated.

Eye bolts 32 extend through the beam 16 and slidably engage the portions 26 of the links, as shown.

By this means the beam is movably coupled to the member 24 and the hounds 15 and provide for the requisite "play" of the beam to permit the shoes to be applied to the wheels.

Attached to one of the hound members 15 and to the axle 10 is a supporting bar 33, and pivoted at 34 to the bar is an operating lever 35.

Coupled to the axle 10 and the bolster member 12 is a bracket device preferably formed of a flat bar bent initially into U shape to form spaced side portions 36 and 37, the terminals of the portion 36 bent to partly enclose one side of the bolster and bearing against the opposite sides of the bolster is a clamp member riveted at one end to the portion 36 of the bracket. The portions 38 and 39 are connected to the bolster by a single clamp bolt 40.

The other side portion 37 of the bracket is bent as shown at 41 to encompass the rear axle and riveted at 42 to the adjacent portion of the part 37.

Pivoted at 43 between the side portions 36 and 37 of the brackets is an operating lever 44 having a hand grip at 45.

At its lower shorter end the lever 44 is coupled to the longer end of the bar 35 by a clip 46 and a right and left threaded rod 46' so that the "throw" of the lever can be controlled as will be obvious.

Coupled at 47 to the beam 16 is a pull member 48, the latter provided with a plurality of apertures, indicated at 49 to receive a pin 50 to pivotally and adjustably couple the member 35 thereto. The member 48 being supported by a segmental brace 51.

By this arrangement it is obvious that the brake may be actuated by force applied to the lever 44. The lever 44 may be manually operated, or can be operated by a pull cable 52 adapted to lead to the front of a vehicle, convenient to the hand of the driver, as indicated in Fig. 6.

The improved device is simple in construction, can be manufactured at slight expense and applied without material structural change to wagons of various forms.

The preferred embodiment of the invention is disclosed in the drawings and set forth in the specification, but it will be understood that modifications within the scope of the claimed invention may be made in the construction without departing from the principle of the invention or sacrificing any of its advantages.

Having thus described the invention what is claimed as new is:—

1. In a device of the class described, the combination with the running gear of a vehicle including the rear axle, rear wheels, real bolster and rear hounds, a brake beam movably supported relative to said rear hounds, a fulcrum device connected to said hounds and axle, a bar pivoted at one end to said fulcrum device, means for coupling said bar to said brake beam, another bracket device formed of a bar bent into U shape and coupled at the ends respectively to the rear axle and rear bolster, an operating lever pivoted between the sides of said last mentioned bracket device, and a link device coupling the said operating lever to said bar.

2. In a brake device, a support adapted to be attached to the running gear of a vehicle, a brake beam, a suspension device for each end of said support and each formed from a single rod bent initially into U shape to form spaced sides with said sides directed inwardly to bear beneath the support and thence directed upwardly to bear against the opposite sides of the support and thence again bent to bear over the upper face of the support, clamp plates apertured to receive the rod and with clamp nuts engaging the terminals of the rods, a brake beam carrying brake shoes in position to engage the wheels, and means for movably coupling said brake beams to said suspension devices.

3. In a brake device, a brake beam, brake shoes at the ends of the beam and each formed with a recess in the wheel engaging face, an apertured wear plate in the bottom of each recess, a U bolt engaging by its side portions through said apertures and enclosing the brake beam, and clamp bolts bearing over the outer face of said beam and adapted to receive the U bolts, and clamp nuts engaging said U bolts and bearing against said clamp plates.

In testimony whereof I affix my signature hereto.

JOSEPH CLAUD ROGERS.